US012602556B2

(12) United States Patent
Beterke et al.

(10) Patent No.: US 12,602,556 B2
(45) Date of Patent: Apr. 14, 2026

(54) SYSTEMS AND METHODS FOR DETERMINING A VALID STATE OF MEASUREMENT SYSTEMS

(71) Applicant: Advantest Corporation, Tokyo (JP)

(72) Inventors: Bernd Beterke, Aspach (DE); Piotr Skwierawski, Frankenthal (DE); Petra Funke, Aidlingen (DE); Roland Friedrich, Winnenden (DE)

(73) Assignee: ADVANTEST CORPORATION, Tokyo (JP)

( * ) Notice: Subject to any disclaimer, the term of this patent is extended or adjusted under 35 U.S.C. 154(b) by 131 days.

(21) Appl. No.: 18/105,169

(22) Filed: Feb. 2, 2023

(65) Prior Publication Data

US 2023/0186042 A1 Jun. 15, 2023

Related U.S. Application Data

(63) Continuation of application No. PCT/EP2020/081541, filed on Nov. 9, 2020.

(51) Int. Cl.
*G06K 7/10* (2006.01)
(52) U.S. Cl.
CPC ................................. *G06K 7/10366* (2013.01)
(58) Field of Classification Search
CPC ................................................ G06K 7/10366

(Continued)

(56) References Cited

U.S. PATENT DOCUMENTS

2009/0002148 A1* 1/2009 Horvitz ................ G08G 1/0112
340/514
2012/0130643 A1* 5/2012 Ozdemir .................. G01V 1/36
702/14

(Continued)

FOREIGN PATENT DOCUMENTS

CN 105022397 11/2015
CN 111200796 A 5/2020

(Continued)

OTHER PUBLICATIONS

First Office Action received for Chinese Application No. 202080102957.0 dated Mar. 27, 2025, 10 pages.

*Primary Examiner* — Daniel A Hess
(74) *Attorney, Agent, or Firm* — Squire Patton Boggs LLP; Sarah Mirza

(57) ABSTRACT

Methods and systems for determining whether a measurement system is used in a valid state, includes: automatically reading out a plurality of information items; automatically obtaining information on current operating environmental conditions; automatically reading reference information items identifying the measurement system components and/or representing one or more characteristics of the measurement system components and information on reference operating environmental conditions; and comparing the read out information items identifying the measurement system components and/or representing one or more characteristics of the measurement system components with the reference information items identifying the measurement system components and/or representing one or more characteristics of the measurement system components, and checking whether the current operating environmental conditions comprise an allowable value or are within an allowable range defined by the information on the reference operating environmental conditions, in order to determine whether the measurement (Continued)

system comprising the plurality of measurement system components is used in the valid state.

18 Claims, 9 Drawing Sheets

(58) Field of Classification Search
USPC ......................................................... 235/451
See application file for complete search history.

(56) References Cited

U.S. PATENT DOCUMENTS

| | | | |
|---|---|---|---|
| 2016/0093193 | A1 | 3/2016 | Silvers et al. |
| 2020/0137608 | A1 | 4/2020 | Wright et al. |
| 2024/0176932 | A1* | 5/2024 | Al Matouq ............. G06F 30/27 |

FOREIGN PATENT DOCUMENTS

| | | | |
|---|---|---|---|
| EP | 3648412 | A1 | 5/2020 |
| WO | 20100102259 | A2 | 9/2010 |
| WO | 20160157278 | A1 | 10/2016 |
| WO | 2019224256 | A1 | 11/2019 |
| WO | 20190224256 | A1 | 11/2019 |

* cited by examiner

100

Reading out a plurality of information items identifying the MS components and/or representing characteristics of the MS components ~101

Combining the read out information items into a data collection (summary data) ~102

Creating a signature ~103

Storing the summary data and the signature ~104

300

Reading out information items identifying system components ─301

Obtaining current operating environmental conditions ─302

Reading reference information items and reference environmental conditions ─303

Comparing read out information items with reference information items ─304

Checking whether current env. conditions are allowable ─305

400

Reading out information items identifying system components — 401

Obtaining allowable environmental conditions — 402

Storing information items and allowable environmental conditions — 403

SYSTEMS AND METHODS FOR DETERMINING A VALID STATE OF MEASUREMENT SYSTEMS

CROSS-REFERENCE TO RELATED APPLICATIONS

This is a continuation of Patent Cooperation Treaty Patent Application No. PCT/EP2020/081541 filed Nov. 9, 2020, which is incorporated herein in its entirety.

TECHNICAL FIELD

Embodiments according to the present application are concerned with protecting measurement systems from use in an invalid state, particularly by determining whether a measurement system is currently used in a valid state.

Embodiments according to the invention are related to a method for determining whether a measurement system comprising a plurality of measurement system components is used in a valid state.

Further embodiments according to the invention are related to a method to support a determination whether a measurement system comprising a plurality of measurement system components is used in a valid state.

Further embodiments according to the invention are related to a method for controlling operation of a measurement system comprising a plurality of measurement system components, wherein the method comprises determining whether a measurement system comprising a plurality of measurement system components is used in a valid state and supporting the indicated determination.

Further embodiments according to the invention are related to a measurement system comprising a plurality of measurement system components.

Further embodiments according to the invention are related to a computer program for performing methods for protecting the measurement system from unauthorized changes and checking an integrity of the measurement system.

The invention can be applied to protecting calibration equipment used to calibrate production equipment.

BACKGROUND OF THE INVENTION

This section provides background information related to the present technology which is not necessarily prior art. A multitude of methods for determining whether measurement systems are in valid state to be properly operated is currently known. The known methods, however, usually use manual check of coherence measurement systems and of calibration status of the systems and its separate components. The outcome of the known methods usually highly depends on the human factor and besides on the completeness of the information in a traceability documentation of the used measurement equipment. Not all required parameters are considered upon taking a decision on whether the measurement system is in a valid state. This leads to errors in measurements due to incompleteness of the system, its wrong calibration or not considered important parameters. In view of the above, there is a desire to create a method which enables an improvement of the reliability of a measurement system in an efficient manner. The techniques can for example consider all possible parameters upon checking a current state of the measurement system and allow reporting of an invalid state of the measurement system, which leads to an improved operation of the measurement systems.

Accordingly, there is a desire to provide a concept, which is more efficient in view of an efficiency of a check of a state of the measurement systems. This object is achieved by the subject matter of the pending independent claims.

SUMMARY OF THE INVENTION

The present technology may best be understood by referring to the following description and accompanying drawings that are used to illustrate embodiments of the present technology directed toward techniques for checking the state of a measurement system.

An embodiment according to the invention creates a method for determining whether a measurement system comprising a plurality of measurement system components is used in a valid state. The method comprises automatically reading out, e.g. using a read out mechanism, a plurality of information items (e.g. uniquely, identifying the measurement system components, e.g. a type identifier and a serial number) and/or representing one or more characteristics of the measurement system components, e.g. a software revision and/or a calibration date and/or a calibration interval; automatically obtaining (e.g. by measuring, e.g. using a measurement device, which is part of the measurement system) information on current operating environmental conditions, e.g. a temperature and/or a humidity and/or a electromagnetic interference, for the measurement system; automatically reading reference information items, e.g. uniquely, identifying the measurement system components and/or representing one or more characteristics of the measurement system components and information on reference operating environmental conditions; and comparing the read out information items, e.g. uniquely, identifying the measurement system components and/or representing one or more characteristics of the measurement system components with the reference information items, e.g. uniquely, identifying the measurement system components and/or representing one or more characteristics of the measurement system components, and checking whether the current operating environmental conditions comprise an allowable value or are within an allowable range defined by the information on the reference operating environmental conditions, in order to determine whether the measurement system comprising the plurality of measurement system components is used in the valid state.

This embodiment is based on the finding that a state of the measurement system can be ensured by collecting all the possible information on the measurement system and its separate components including current environmental conditions and considering the environmental conditions upon taking a decision on whether the measurement system is in a valid state and could properly operate. This allows avoiding unknown effect of the environmental conditions, such as too high or too low temperatures, extreme humidity levels and/or unknown effects of electromagnetic influence. When using the measurement system, it is possible to check whether actual measurement conditions are in agreement with the allowable operating environmental conditions.

According to an embodiment, the method further comprises reporting, e.g. to a user; e.g. using a user interface; e.g. storing, a result of the determination whether the measurement system comprising the plurality of measurement system components is used in the valid state, e.g. indicating a date of the determination. The result of the determination may be used to take a decision on whether the measurement system could be used in a current state and/or as a trigger to further blocking the measurement system to avoid operating the measurement system in case the environmental conditions or any parameters of the measurement system or its components do not allow for a proper operation of the system.

According to an embodiment, the method further comprises automatically blocking the measurement system in case it is determined that the measurement system is used in invalid state. This allows avoiding operating the measurement system in case the environmental conditions or any parameters of the measurement system or its components do not allow for a proper operation of the system and minimize measurement errors.

According to an embodiment, the measurement system can include calibration equipment, configured to calibrate production equipment, e.g. an automated test equipment. Thus, it can ensure that the production equipment is reliably calibrated.

According to an embodiment, the method further comprises obtaining a certificate confirming that the measurement system is used in the valid state.

According to an embodiment, obtaining the certificate is performed by the measurement system and/or by a remote server. This certificate could, for example, be issued by a remote server of the manufacturer of the measurement system.

According to an embodiment, the method further comprises automatically sending result of the determination whether the measurement system comprising the plurality of measurement system components is used in the valid state, indicating e.g. a date of the determination, to the remote server, to be stored on the remote server, e.g. to the server operated by the provider (company) of the measurement system. This allows the manufacturer to control whether his measurement equipment is used under appropriate conditions and to certify reliability of the measurement equipment, or of equipment calibrated using the measurement equipment (or measurement system).

According to an embodiment, one or more of measurement system components which do not have a built-in functionality to report information items to, e.g. uniquely, identify the respective measurement system components, e.g. measurement system components that are configured to be read manually only, and not automatically, which are not tracked automatically; e.g. passive measurement system components, like cables, switches, relays, power splitters, shielding equipment, connectors, adaptors, and so on, or older measurement devices which do not allow for automatically readout of a unique identifier like a serial number via an external communication interface, are combined with associated local storage devices to enable automatically reading out measurement system component specific information items identifying the measurement system components which do not have a built-in functionality to report information items to, e.g. uniquely, identify the respective measurement system components. Combining the components with local storage devices having communication interfaces allows automatic tracking of the state of the measurement equipment, which generally cannot be tracked automatically, thus enabling automatically reading out the information items identifying all the components of the measurement system without involvement of the user.

According to an embodiment, the method comprises combining the measurement system components which do not have a built-in functionality to report information items to, e.g. uniquely, identify the respective measurement system components with the associated local storage devices prior to automatically reading out the information items, e.g.

uniquely, identifying the respective measurement system components. Automatic collecting of the parameters of all the components of the measurement system at the same time (or at least in a single process flow) during the reading out step is thus provided.

According to an embodiment, the measurement system components which do not have a built-in functionality to report information items to, e.g. uniquely, identify the respective measurement system components are inseparably combined with associated local storage devices. This allows exchanging the respective measurement system component together with the respective local storage device and ensuring that automatic reading of all the components is enabled even upon replacing the respective component. In particular it is prevented that a measurement system component which does not have a built-in functionality to report information items is exchanged without noticing the change.

According to an embodiment, the measurement system components which do not have a built-in functionality to report information items to, e.g. uniquely, identify the respective measurement system components are combined with respective associated local storage devices in such a manner that the measurement system components cannot be separated from the respective associated local storage devices in a toolless manner, or the measurement system components which do not have a built-in functionality to report information items to, e.g. uniquely, identify the respective measurement system components are combined with respective associated local storage devices in such a manner that the measurement system components cannot be separated from the respective associated local storage devices in a nondestructive manner, or the measurement system components which do not have a built-in functionality to report information items to, e.g. uniquely, identify the respective measurement system components are combined with respective associated local storage devices in such a manner that the measurement system components cannot be separated from the respective associated local storage devices without breaking a seal. This reliably prevents that a measurement system component which does not have a built-in functionality to report information items is exchanged without noticing the change, since high effort would be needed to relocate the local storage device.

According to an embodiment, at least one of the measurement system components which do not have a built-in functionality to report information items to, e.g. uniquely, identify the respective measurement system components is glued to a respective one of the local storage devices. This is a particularly efficient solution to prevent unauthorized exchange of the measurement system component.

According to an embodiment, at least one of the measurement system components which do not have a built-in functionality to report information items to, e.g. uniquely, identify the respective measurement system components is arranged in a separate housing, e.g. box, or e.g. cover, with a respective one of the local storage devices. The separate hardware unit with a communication interface is thus provided, which comprises the measurement system component and the local storage device with the communication interface.

According to an embodiment, the one or more of respective local storage devices are one of the following: a USB storage device, a Network attached storage device, preferably wired LAN device, an RFID tag. These storage devices are only some examples of the storage device which can be used. Any other storage device could be used in other embodiments.

According to an embodiment, the one or more measurement system components which do not have a built-in functionality to report information items to, e.g. uniquely, identify the respective measurement system components comprise one or more, e.g. active, measurement devices, e.g. measurement devices configured to report a measurement result via an external interface, e.g. to a measurement system controller. Particularly, the older measurement devices not having communication interfaces could be used.

According to an embodiment, the one or more measurement system components which do not have a built-in functionality to report information items to, e.g. uniquely, identify the respective measurement system components comprise one or more passive measurement system components, e.g. signal path components, passive switches, relays, attenuators, connectors, adaptors, cables, sensors, etc. Reading out the information, e.g. from memories attached to these passive measurement system components, allows tracking the state of the measurement system as a whole and considering any fluctuations, e.g. voltage and resistance in the connection lines between the components. A change of passive components, which would degrade the system performance, becomes detectable.

According to an embodiment, the one or more measurement system components which do not have a built-in functionality to report information items to, e.g. uniquely, identify the respective measurement system components comprise one or more of the following measurement system components: signal path components, coupling components, couplers, adapters, cables. Thus, a change of such components, which would degrade the system performance, becomes detectable.

According to an embodiment, the one or more measurement system components which do not have a built-in functionality to report information items to, e.g. uniquely, identify the respective measurement system components comprise one or more of the following measurement system components: thermodynamic components, fixed power supply components, antennas, shielding housing components, cooling components, e.g. fans, e.g. determining aerodynamic characteristics of the fans. Thus, a change of such components, which would degrade the system performance, becomes detectable.

According to an embodiment, the method comprises automatically reading out information items identifying the one or more measurement system components which do not have a built-in functionality to report information items to, e.g. uniquely, identify the respective measurement system components from respective local storage devices, e.g. local memories, associated with the one or more measurement system components which do not have a built-in functionality to report information items to, e.g. uniquely, identify the respective measurement system components.

According to an embodiment, the one or more characteristics of the measurement system components comprise a wear out condition of at least one of the measurement system components. This allows determining whether all the components of the measurements system function properly in order to avoid any measurement errors.

According to an embodiment, an information item identifying the wear out condition is a value of a counter which is arranged in a respective measurement system component, wherein one is added to the counter upon each use of the respective measurement system component (or, generally speaking, wherein the value is incremented or decremented for each usage or state change of the respective measurement system component). Thus, the memory associated with the respective measurement system component is re-used to also track a wear out of the respective measurement system component. By checking the wear out information, an expected unreliability of the measurement system can be identified.

According to an embodiment, the method further comprises performing a self-estimation, e.g. measuring one or more parameters, e.g. resistance measurement, e.g. for relays, of a respective measurement system component to determine the wear out condition of the respective measurement system components. Consequently, a reliability of the measurement system can be increased by detecting fault conditions of the measurement system.

According to an embodiment, wherein the information on the current operating environmental conditions and the information on the reference operating environmental conditions comprise a humidity and/or a temperature and/or an electromagnetic interference. This allows to avoid unknown effect of the environmental conditions, such as too high or too low temperatures, extreme humidity level and/or unknown effects of electromagnetic influence. When using the measurement system, it is possible to check whether actual measurement conditions are in agreement with the allowable operating environmental conditions.

An embodiment according to an invention creates a method to support a determination whether a measurement system comprising a plurality of measurement system components is used in a valid state, the method comprising: automatically reading out, e.g. using as read out mechanism, a plurality of information items, e.g. uniquely, identifying the measurement system components, e.g. a type identifier and a serial number, and/or representing one or more characteristics of the measurement system components, e.g. a software revision and/or a calibration date and/or a calibration interval; obtaining, e.g. reading from the user interface, or reading from a memory associated with a measurement system component, e.g. collecting, e.g. automatically obtaining, information on allowable, e.g. optimal, operating environmental conditions, e.g. an allowable temperature range and/or an allowable humidity range and/or an allowable maximum electromagnetic interference, e.g. used in calibration of the measurement system by the manufacturer, or deviating from environment conditions used in calibration of the measurement system by no more than an allowable tolerance, for the measurement system; storing the information items identifying the measurement system components and/or representing one or more characteristics of the measurement system components and the information on the allowable, e.g. optimal, operating environmental conditions for use in the determination whether the measurement system comprising the plurality of measurement system components is used in the valid state.

This embodiment is based on the finding that a proper operating state of the measurement system can be defined by collecting all the possible information on the measurement system and its separate components including allowed environmental conditions and storing this information to be used for supporting a determination of whether the measurement system is taking a decision on whether the measurement system is in a valid state and could properly operate. This allows avoiding unknown effect of the environmental conditions, such as too high or too low temperatures, extreme humidity levels and/or unknown effects of electromagnetic influence. When using the measurement system, it is possible to check whether actual measurement conditions are in agreement with the allowable operating environmental conditions.

According to an embodiment, the method further comprises automatically combining, e.g. using a combiner, the read out information items, e.g. a serial number, a type identifier, a software revision, a calibration date, a calibration interval, etc., of each of the plurality of the measurement system components into a data collection which is represented by summary data, e.g. a summary file. Combining the information items in one data collection simplifies storing the information items and its comparison with the reference values.

According to an embodiment, the method further comprises creating a signature on the basis of the summary data and storing the signature. This improves protection of the measurement system from unauthorized changes.

According to an embodiment, creating the signature includes signing the summary data with a private key. The security of the data protection is thus improved. Also, a check of the integrity of the summary data is possible using a public key, which allows for a very reliable implementation. In particular, the concept allows any third-party having access to the public key corresponding to the private key to check the integrity.

According to an embodiment, the private key is a confidential private key. The security of the data protection is further improved due to a confidentiality of the private key.

According to an embodiment, the summary data and the signature are stored in two separate files, e.g. summary file and signature file, or wherein the summary data and the signature are stored in one file.

According to an embodiment, the measurement system further comprises at least one local storage device and the information items identifying the measurement system components and/or representing one or more characteristics of the measurement system components and the information on the allowable, e.g. optimal, operating environmental conditions are stored in the at least one local storage device. This provides an autonomous measurement system, the state of which could be determined and estimated without sending its parameters to any remote server.

According to an embodiment, the information items identifying the measurement system components and/or representing one or more characteristics of the measurement system components are stored in a first local storage device of the measurement system and the information on the allowable, e.g. optimal, operating environmental conditions is stored in a second local storage device of the measurement system. This allows providing an autonomous measurement system, the state of which could be determined and estimated without sending determined environmental conditions to any remote server.

According to an embodiment, the one or more characteristics of the measurement system components comprise a wear out condition of at least one of the measurement system components. This allows determining whether all the components of the measurements system function properly in order to avoid any measurement errors.

According to an embodiment, an information item identifying the wear out condition is a value of a counter which is arranged in a respective measurement system component, wherein one is added to the counter upon each use of the respective measurement system component (or, generally speaking, wherein the value is incremented or decremented for each usage or state change of the respective measurement system component). Thus, the memory associated with the respective measurement system component is re-used to also track a wear out of the respective measurement system component. By checking the wear out information, an expected unreliability of the measurement system can be identified.

According to an embodiment, the method further comprises performing a self-estimation, e.g. by measuring one or more parameters, e.g. resistance measurement, e.g. for relays, of a respective measurement system component to determine the wear out condition of the respective measurement system components. Consequently, a reliability of the measurement system can be increased by detecting fault conditions of the measurement system.

According to an embodiment, the information on the current operating environmental conditions and the information on the reference operating environmental conditions comprise a humidity and/or a temperature and/or an electromagnetic interference. This allows to avoid unknown effect of the environmental conditions, such as too high or too low temperatures, extreme humidity level and/or unknown effects of electromagnetic influence. When using the measurement system, it is possible to check whether actual measurement conditions are in agreement with the allowable operating environmental conditions.

According to an embodiment, one or more of measurement system components which do not have a built-in functionality to report information items to, e.g. uniquely, identify the respective measurement system components, e.g. measurement system components that are configured to be read manually only, and not automatically, which are not tracked automatically, e.g. passive measurement system components, like cables, switches, relays, power splitters, shielding equipment, connectors, adaptors, and so on, or older measurement devices which do not allow for e readout of a unique identifier like a serial number via an external communication interface, are combined with associated local storage devices to enable automatically reading out measurement system component specific information items identifying the measurement system components which do not have a built-in functionality to report information items to, e.g. uniquely, identify the respective measurement system components. Combining the components with local storage devices having communication interfaces allows automatic tracking of the state of the measurement equipment, which conventionally cannot be tracked automatically, thus enabling automatically reading out the information items identifying all the components of the measurement system without involvement of the user. In particular, using such a concept it is possible to automatically detect an exchange of a passive component, which may degrade the functionality of the measurement system.

According to an embodiment, the method comprises combining the measurement system components which do not have a built-in functionality to report information items to, e.g. uniquely, identify the respective measurement system components with the associated local storage devices prior to automatically reading out the information items, e.g. uniquely, identifying the respective measurement system components. Automatic collecting of the parameters of all the components of the measurement system at the same time (or at least in a single process flow) during the reading out step is thus provided.

According to an embodiment, the measurement system components which do not have a built-in functionality to report information items to, e.g. uniquely, identify the respective measurement system components are inseparably combined with associated local storage devices. This allows exchanging the respective measurement system component together with the respective local storage device and ensuring that automatic reading of all the components is enabled even upon replacing the respective component. In particular, it is prevented that a measurement system component which does not have a built-in functionality to report information items is exchanged without noticing the change.

According to an embodiment, the measurement system components which do not have a built-in functionality to report information items to, e.g. uniquely, identify the respective measurement system components are combined with respective associated local storage devices in such a manner that the measurement system components cannot be separated from the respective associated local storage devices in a toolless manner, or the measurement system components which do not have a built-in functionality to report information items to, e.g. uniquely, identify the respective measurement system components are combined with respective associated local storage devices in such a manner that the measurement system components cannot be separated from the respective associated local storage devices in a nondestructive manner, or wherein the measurement system components which do not have a built-in functionality to report information items to, e.g. uniquely, identify the respective measurement system components, are combined with respective associated local storage devices in such a manner that the measurement system components cannot be separated from the respective associated local storage devices without breaking a seal. This reliably prevents that a measurement system component which does not have a built-in functionality to report information items is exchanged without noticing the change, since high effort would be needed to relocate the local storage device.

According to an embodiment, at least one of the measurement system components which do not have a built-in functionality to report information items to, e.g. uniquely, identify the respective measurement system components is glued to a respective one of the local storage devices. This is a particularly efficient solution to prevent unauthorized exchange of the measurement system component.

According to an embodiment, at least one of the measurement system components which do not have a built-in functionality to report information items to, e.g. uniquely, identify the respective measurement system components is arranged in a separate housing, e.g. a box, or e.g. a cover, with a respective one of the local storage devices. The separate hardware unit with a communication interface is thus provided, which comprises the measurement system component and the local storage device with the communication interface.

According to an embodiment, the one or more of respective local storage devices are one of the following: a USB storage device, a Network attached storage device, preferably wired LAN device, an RFID tag. These storage devices are only some examples of the storage device which can be used. Any other storage device could be used in other embodiments.

According to an embodiment, the one or more measurement system components which do not have a built-in functionality to report information items to, e.g. uniquely, identify the respective measurement system components comprise one or more, e.g. active, measurement devices, e.g. measurement devices configured to report a measurement result via an external interface, e.g. to a measurement system controller. Particularly, the older measurement devices not having communication interfaces could be used.

According to an embodiment, the one or more measurement system components which do not have a built-in functionality to report information items to, e.g. uniquely, identify the respective measurement system components comprise one or more passive measurement system components, e.g. signal path components, passive switches, relays, attenuators, connectors, adaptors, cables, sensors, etc. Reading out the information, e.g. from memories attached to these passive measurement system components, allows tracking the state of the measurement system as a whole and considering any fluctuations, e.g. voltage and resistance in the connection lines between the components. A change of passive components, which would degrade the system performance, becomes detectable.

According to an embodiment, the one or more measurement system components which do not have a built-in functionality to report information items to, e.g. uniquely, identify the respective measurement system components comprise one or more of the following measurement system components: signal path components, coupling components, couplers, adapters, cables. Thus, a change of such components, which would degrade the system performance, becomes detectable.

According to an embodiment, the one or more measurement system components which do not have a built-in functionality to report information items to, e.g. uniquely, identify the respective measurement system components comprise one or more of the following measurement system components: thermodynamic components, fixed power supply components, antennas, shielding housing components, cooling components, e.g. fans, e.g. determining aerodynamic characteristics of the fans. Thus, a change of such components, which would degrade the system performance, becomes detectable.

According to an embodiment, the method comprises automatically reading out information items identifying the one or more measurement system components which do not have a built-in functionality to report information items to, e.g. uniquely, identify the respective measurement system components from respective local storage devices, e.g. local memories, associated with the one or more measurement system components which do not have a built-in functionality to report information items to, e.g. uniquely, identify the respective measurement system components.

An embodiment according to the invention creates a method for controlling operation of a measurement system comprising a plurality of measurement system components, wherein the method comprises determining whether a measurement system comprising a plurality of measurement system components is used in a valid state according to any of the above described embodiments, and supporting the indicated determination according to one of claims according to any of the above described embodiments.

An embodiment according to the invention creates a measurement system comprising a plurality of measurement system components, configured to perform the method according to any of the above described embodiments.

An embodiment according to the invention creates a computer program having a program code for performing, when running on a computer, methods according to any of the above described embodiments.

These and further advantageous aspects are the subject of the dependent claims. The methods and the measurement system described above may optionally be supplemented by any of the features, functionalities and details disclosed herein (i.e., the entire document), both individually and taken in combination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
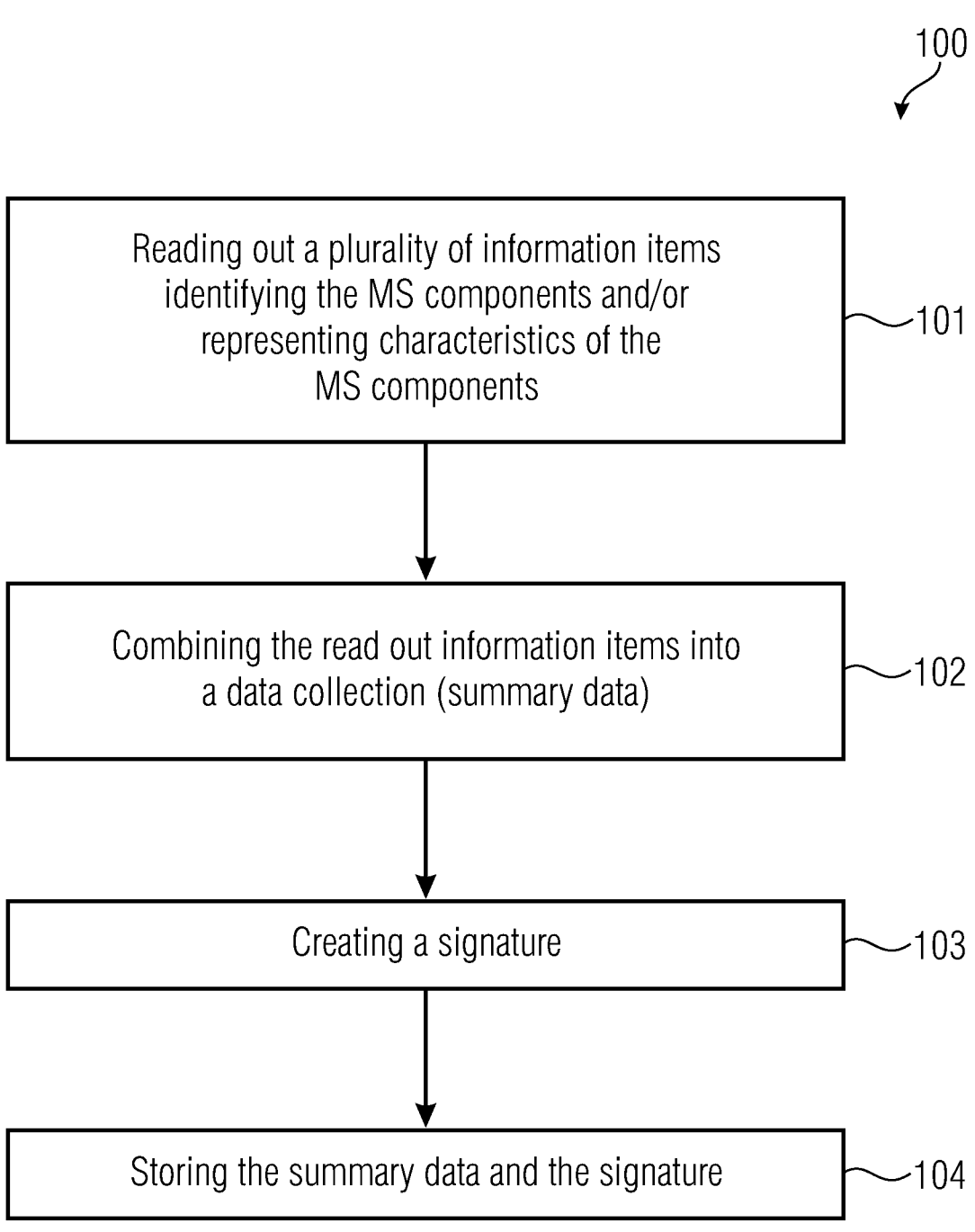
FIG. 1 shows a flow chart of a computer implemented method of protecting a measurement system from unauthorized changes in accordance with an embodiment of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

FIG. 1 shows a computer implemented method 100 of protecting a measurement system having a plurality of measurement system components and at least one local storage device from unauthorized change in accordance with an embodiment of the invention. The measurement system components may include such measurement components as e.g. voltage meters, frequency meters, temperature meters, humidity meters. The measurement system components may include connecting components, for example cables. The measurement system components may include e.g. one or more of: power dividers, relays, passive components. The measurement system components may further include, for example, one or more smart devices which have a built-in functionality to report one or more information items uniquely identifying the smart device. The measurement system components may also include one or more so called "manual devices" which do not have a built-in functionality to report information items to uniquely identify these devices. Such "manual devices" may, for example, be combined with a local storage device having stored such information items.

The method of protecting a measurement system starts at step 101 by automatically reading out a plurality of information items, for example uniquely, identifying the measurement system components and/or representing one or more characteristics of the measurement system components. A readout mechanism could be provided in the measurement system itself to perform the automatic reading step. Alternatively, an external readout device could be used to automatically read out and collect all the information items. The information items identifying the measurement system components could include, for example, a type identifier and a serial number of the respective component. The information items representing one or more characteristics of the measurement system components could, for example, include a software revision date, a software version, a calibration date, a calibration interval, etc.

The method further proceeds with automatically combining the readout information items at step 102, e.g. using a combiner or a combining unit provided in the measurement system or outside of the measurement system. The information items of each of the plurality of the measurement system components are automatically combined at step 102 into a data collection. The data collection is represented by summary data, which may be stored, for example, as a summary file, or a summary data file. At step 103 a signature, to be stored as e.g. a signature file, is created on the basis of the summary data. The signature could be created, for example, using an openSSL toolkit, e.g. using a confidential private key. However, other signature generating concepts may also be used. Generally speaking a signature is cryptographic information which confirms, in a cryptographically reliable manner (fulfilling a desired reliability criterion) that the summary data was generated by a certain (trustworthy) person or entity and that the summary data was not altered in the meantime. Worded differently, the signature may be considered as information for verifying the authenticity of digital messages or documents (e.g. of the summary data). A valid digital signature, where the prerequisites are satisfied, gives a recipient very strong reason to believe that the message (e.g. the summary data) was created by a known sender (authentication), and that the message was not altered in transit (integrity).

At step 104 the summary data and the signature are stored in the at least one local storage device of the measurement system. The signature and the summary data could be stored in two separate files, e.g. a summary file and a signature file, or in one file.

Figure 2:
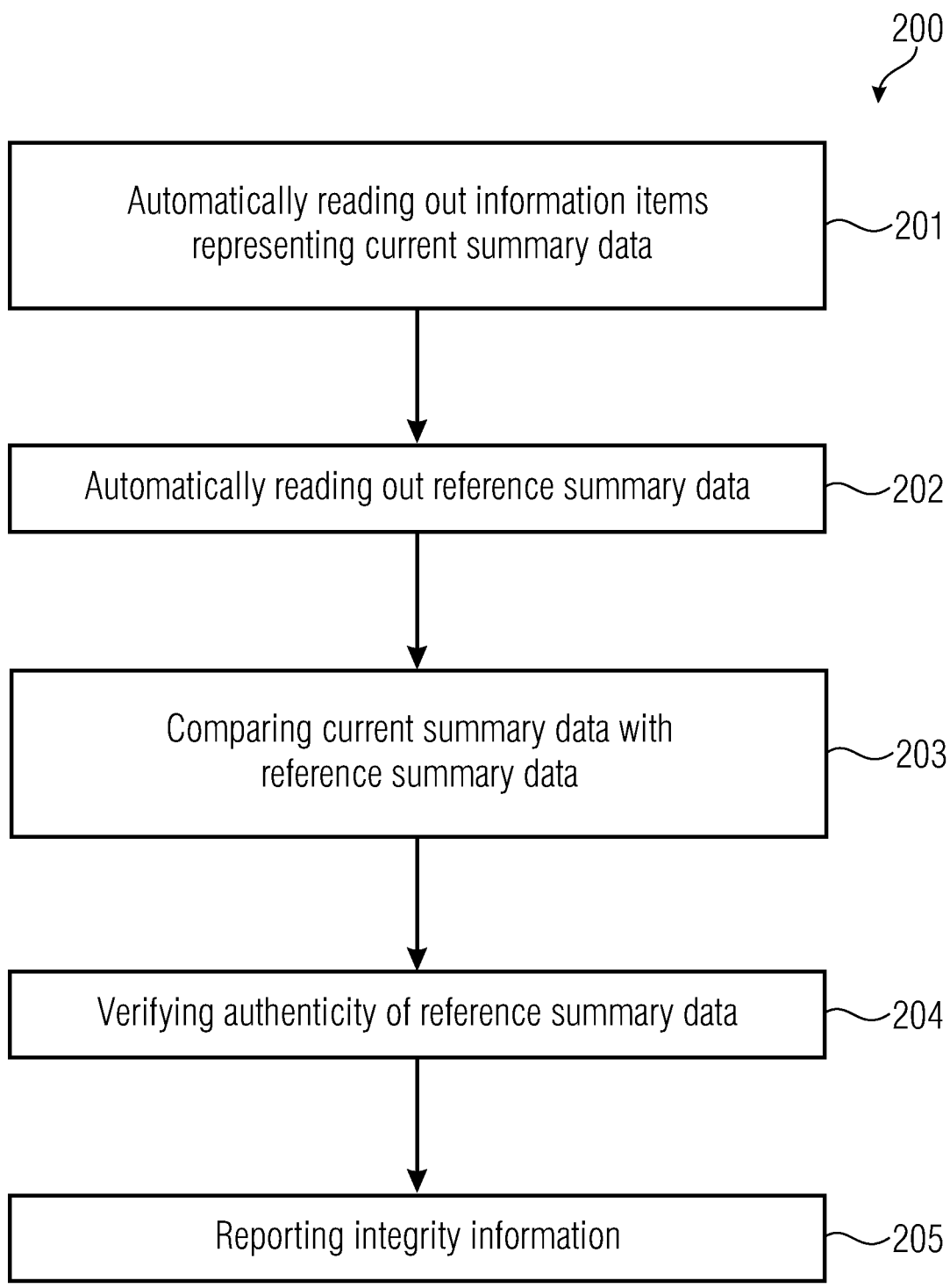
FIG. 2 shows a flow chart of a computer implemented method for checking an integrity of a measurement system in accordance with an embodiment of the present technology.

The method 100 allows for a provision of information (e.g. the summary data and the associated signature), which allows for a check of the integrity of the measurement system (e.g. using the method of FIG. 2). In other words, the summary data and the corresponding signature may serve as input data, e.g. as a reference summary data and a signature associated with the reference summary data, of the method according to FIG. 2.

However, it should be noted that the method 100 may optionally be supplemented by any of the features, functionalities and details disclosed herein, both individually or taken in combination.

FIG. 2 shows a computer implemented method 200 for checking an integrity of a measurement system comprising a plurality of measurement system components and at least one local storage device in accordance with an embodiment of the invention. For example, the method may be used to check the integrity of the measurement system mentioned in the discussion of FIG. 1. For example, the method may be used to check whether the measurement system mentioned in the discussion of FIG. 1 has remained unchanged. The measurement system components may, for example, include such measurement components as e.g. voltage meters, frequency meters, temperature meters, humidity meters. The measurement system components may include connecting components, for example cables. The measurement system components may, for example, include e.g. one or more of: power dividers, relays, passive components. The measurement system components may further include one or more smart devices which have a built-in functionality to report one or more information items uniquely identifying the smart device. The measurement system components may also include one or more so called "manual devices" which do not have a built-in functionality to report information items to uniquely identify these devices. Such "manual devices" may, for example, be combined with a local storage device having stored such information items.

The methods starts at step 201 by automatically reading out a plurality of information items, for example uniquely, identifying the measurement system components and/or representing one or more characteristics of the measurement system components. A readout mechanism could be provided in the measurement system itself to perform the automatic reading step. Alternatively, an external readout device could be used to automatically readout and collect all the information items. The information items identifying the measurement system components could include, for example, a type identifier and a serial number of the respective component. The information items representing one or more characteristics of the measurement system components could, for example, include a software revision date, a software version, a calibration date, a calibration interval, etc.

The readout information items could be used e.g. in order to obtain a summary file associated with a current measurement system or a current combination of the measurement system components. In this example, the readout information items of each of the plurality of the measurements system components are automatically combined into a data collection which is represented by actual summary data, e.g. stored into a summary file.

At step 202 the method proceeds with automatically reading reference Summary Data, which could be represented e.g. by a reference summary file, and a signature, which could be represented by a signature file, associated with the reference summary data, e.g. associated with the reference summary file, from the at least one local storage device of the measurement system. However, the reference summary data and the associated signature may also be obtained from a single file in which both data items are included.

The reference summary data and the signature could, for example, be created and stored in the at least one local storage device by the steps of the method 100 shown in FIG. 1.

The method further proceeds with comparing at step 203 the current summary data, which is based on the readout information items, or at least a plurality of information items of the current summary data, with the reference summary data, or at least with a plurality of information items of the reference summary data. The plurality of information items of the current summary data chosen for comparing could include, for example, such information items which are needed to uniquely identify a measurement system component and those characteristics of the measurement system component which need to remain unchanged (e.g., a calibration date, e.g. to ensure that there is no unauthorized calibration by a (non-trustworthy) third party). The comparing is performed, for example, in order to obtain a component equality information as an intermediate information. In case the readout information items were combined into the data collection, such as the summary file, at step 203 comparing of the summary file with the reference summary file is performed.

The method verifies at step 204 an authenticity of the reference summary data using the signature, e.g. by performing a signature check. The signature check could be performed, for example, by an openSSL toolkit, e.g. using a public key corresponding to a private key used to create a signature. This verifying step is performed, for example, in order to obtain a signature check information as an intermediate information.

Steps 203 and 204 are performed in order to obtain a measurement system integrity information, for example, on the basis of the component equality information and the signature check information. The measurement system integrity information shows whether any of the measurement system components were replaced and/or whether their parameters were changed after the last use of the measurement system or after its manufacturing (or assembly) and calibration by the manufacturer. The measurement system integrity information could be further reported at step 205 to the user of the measurement system or to the manufacturer of the measurement system (e. using a user interface or using an electronic message). The measurement system integrity information could be also used as a trigger for further blocking the measurement system so that no further use of the measurement system with changed integrity is possible.

However, it should be noted that the method 200 may optionally be supplemented by any of the features, functionalities and details disclosed herein, both individually or taken in combination.

Figure 3:
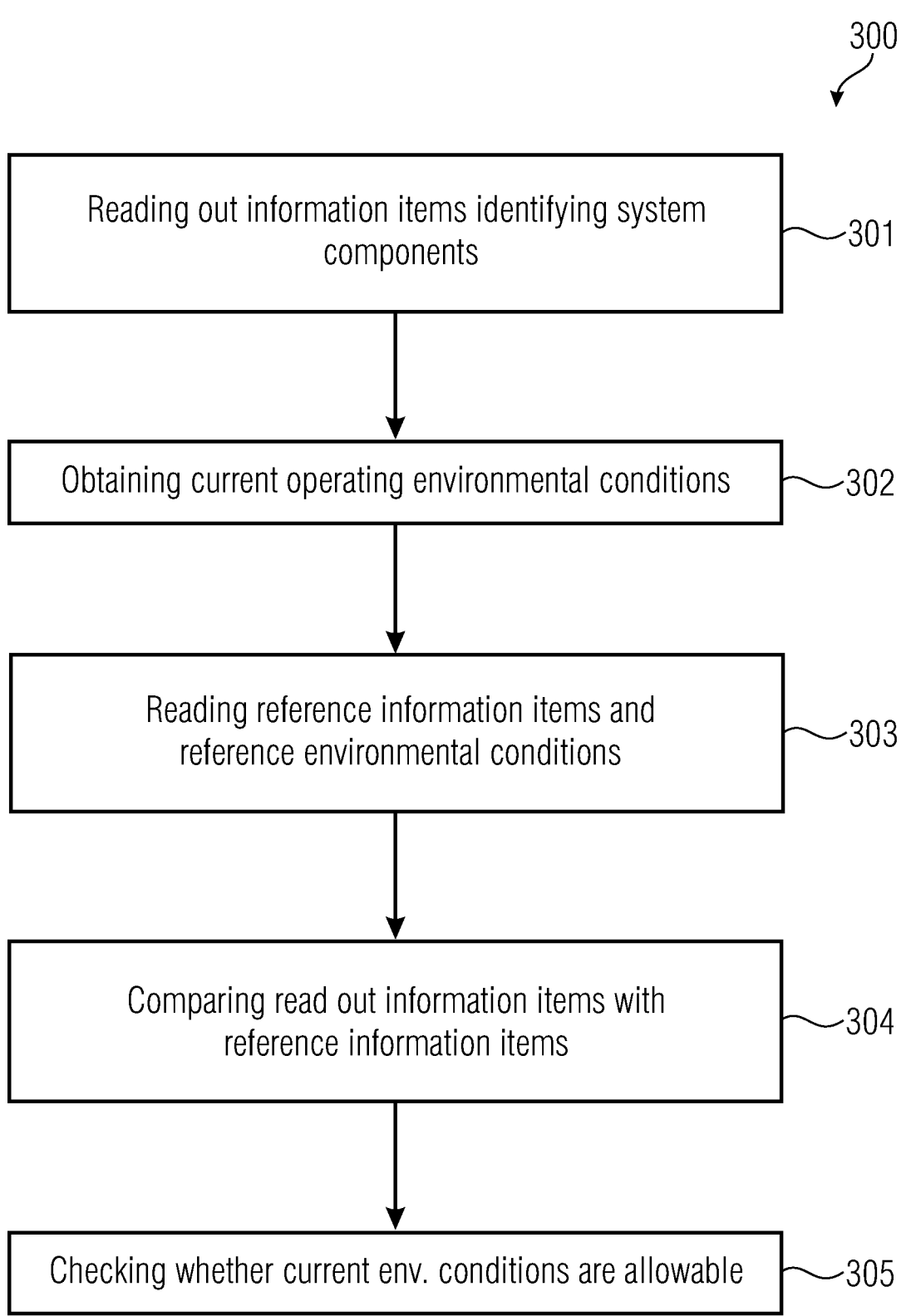
FIG. 3 shows a flow chart of a computer implemented method for determining whether a measurement system comprising a plurality of measurement components is used in a valid state in accordance with an embodiment of the present technology.

FIG. 3 shows a computer implemented method 300 for determining whether a measurement system comprising a plurality of measurement components is used in a valid state in accordance with an embodiment of the invention.

The method in accordance with this embodiment considers not only the integrity of the measurement system but also the (relevant) environmental conditions in which the measurement system is used to determine whether the measurement system could be validly used, e.g. without erroneous measuring results coming from the calibration errors and/or the environmental influence (e.g. of the humidity or temperature of the environment). Unknown effects of environmental conditions on the measurements results are avoided in this embodiment. When using the measurement system, it is possible to check whether actual measurement conditions are in agreement with the allowable operating environmental conditions. The information on the allowable operating environmental conditions may be signed, e.g. a signature may be created and stored, e.g. in the at least one local storage device of the measurement system.

The method starts with reading out at step 301 a plurality of information items, e.g. uniquely, identifying the measurement system components and/or representing one or more characteristics of the measurement system components. A readout mechanism could be provided in the measurement system itself to perform the automatic reading step. Alternatively, an external readout device could be used to automatically readout and collect all the information items. The information items identifying the measurement system components could include, for example, a type identifier and a serial number of the respective component. The information items representing one or more characteristics of the measurement system components could, for example, include a software revision date, a software version, a calibration date, a calibration interval, etc.

At step 302 the method proceeds with automatically obtaining information on current operating environmental conditions for the measurement system. The information could be obtained by measuring environmental conditions, e.g. using a measurement device being a part of the measurement system, for example a temperature sensor, a humidity sensor or an electromagnetic radiation sensor. The information on different current operating environmental conditions could be thus received, for example a temperature information, and/or a humidity information, and/or an electromagnetic interference information.

At step 303 the method proceeds with automatically reading reference information items, e.g. uniquely, identifying the measurement system components and/or representing one or more characteristics of the measurements system components and information on reference operating environmental conditions. The reference operating environmental conditions could, for example, be determined by manufacturer of the measurement system or separate components of the measurements system based on possible effects of environmental conditions. The reference operating environmental conditions could be defined as allowable values, e.g. of temperature or electromagnetic radiation or humidity, but most often as an allowable range of these parameters. The allowable range is a range within which the measurement system operates without unexpected errors and considerable fluctuations of the measurement results. Thus, the information about the reference operating environmental conditions could, for example, comprise an information describing a minimum allowable temperature and a maximum allowable temperature (e.g. in the form of a minimum value and a maximum value, or in the form of a target value and a tolerance value).

The method further proceeds with comparing at step 304 the readout information items, e.g. uniquely, identifying the measurement system components and/or representing one or more characteristics of the measurement system components with the reference information items, e.g. uniquely, identifying the measurement system components and/or representing one or more characteristics of the measurement system components.

At step 305 the method checks whether the current operating environmental conditions comprise an allowable value or are within an allowable range defined by the information on the reference operating environmental conditions.

Steps 304 and 305 are performed in order to determine whether the measurement system comprising the plurality of measurements system components is used in the valid state. The result of the determination could be reported to a user, for example using a user interface. Alternatively, the result of the determination could be reported using an electronic message. Blocking, e.g. automatically, of the measurement system could be performed in response to the determination that the measurements system is used in invalid state.

A certificate on a validity state of the measurement system could be issued upon the completion of the method 300 in case it was determined that the measurement system is used in the valid state. The certificate could further contain the date and time of performing the method as well as the current state of the measurements system and current operating environmental conditions.

However, it should be noted that the method 300 may optionally be supplemented by any of the features, functionalities and details disclosed herein, both individually or taken in combination.

Figure 4:
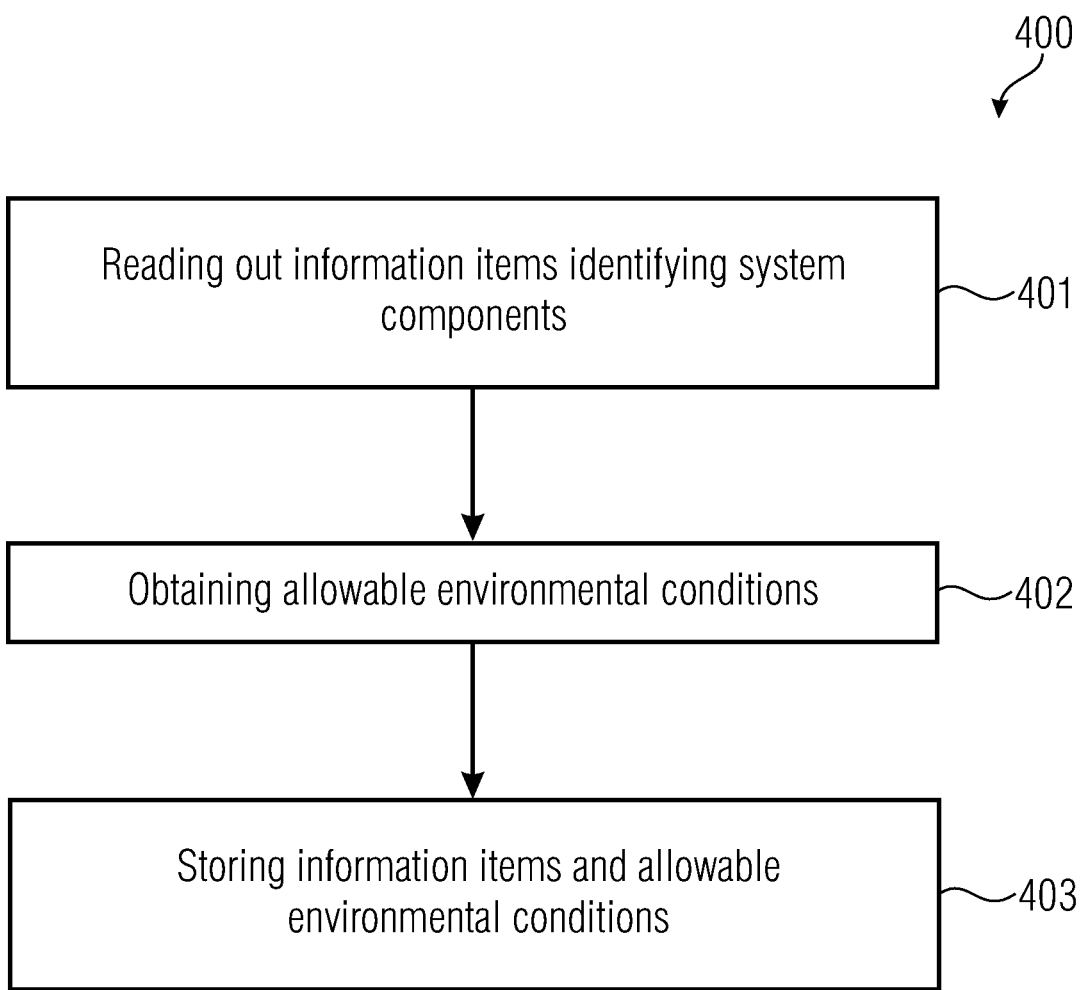
FIG. 4 shows a flow chart of a computer implemented method to support a determination whether a measurement system comprising a plurality of the measurement system components is used in a valid state in accordance with an embodiment of the present technology.

FIG. 4 shows a computer implemented method 400 to support a determination whether a measurement system comprising a plurality of the measurement system components is used in a valid state, in accordance with an embodiment of the invention.

The method starts at step 401 by automatically reading out a plurality of information items, e.g. uniquely, identifying the measurement system components and/or representing one or more characteristics of the measurement system components. A readout mechanism could be provided in the measurement system itself to the perform automatic reading step. Alternatively, an external readout device could be used to automatically readout and collect all the information items. The information items identifying the measurement system components could include for example a type identifier and a serial number of the respective component. The information items representing one or more characteristics of the measurement system components could, for example, include a software revision date, a software version, a calibration date, a calibration interval, etc.

At step 402 the method proceeds with obtaining information on allowable operating environmental conditions for the measurement system. Obtaining may include e.g. reading from the user interface or reading from a memory associated with a measurement system component, or e.g. collecting, or e.g. automatically obtaining. Allowable operating environmental conditions include e.g. an allowable temperature range and/or an allowable humidity range and/or an allowable maximum electromagnetic interference. Allowable operating environmental conditions could, for example, correspond to (e.g. be equal to, or be in an interval around) the environmental conditions which have been used in calibration of the measurement system (e.g. by the manufacturer, or by a trustworthy entity, or deviate from environmental conditions used in calibration of the measurement system by no more than an allowable tolerance.

The information on the allowable operating environmental conditions may be signed, e.g. a signature may be created and stored, e.g. in the at least one local storage device of the measurement system. A procedure of creating a signature, for example, as described with reference to FIG. 6, may be used for signing.

The method ends at step 403 by storing the information items identifying the measurements system components and/or representing one or more characteristics of the measurements system components and the information on the allowable operating environmental conditions for use in the determination whether the measurement system comprising the plurality of measurement system components is used in the valid state.

The stored information could be further used as a reference information upon performing the method shown in FIG. 3.

However, it should be noted that the method 400 may optionally be supplemented by any of the features, functionalities and details disclosed herein, both individually or taken in combination.

Figure 5:
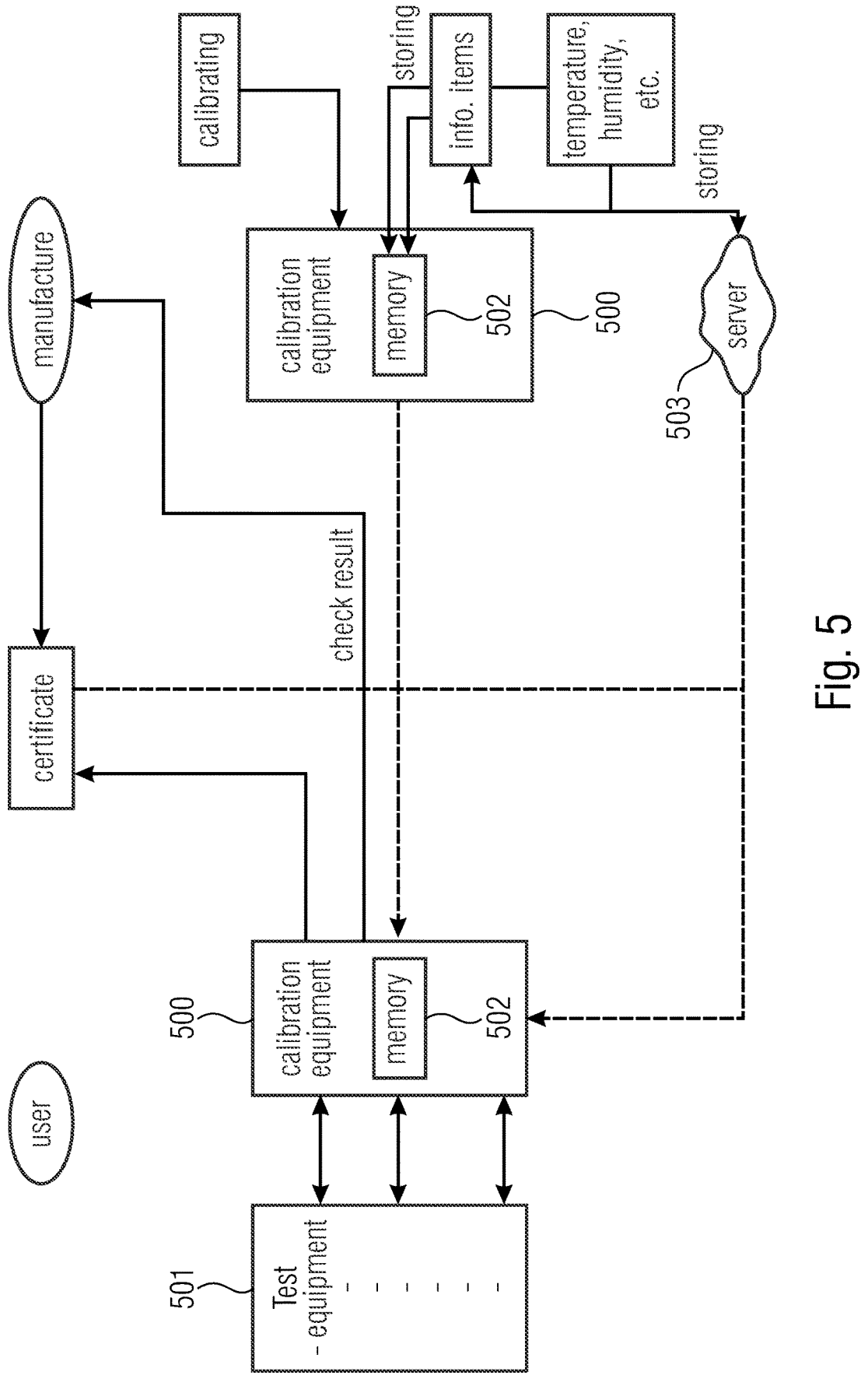
FIG. 5 shows a schematic representation of a measurements system used as a calibration equipment for calibration of a production equipment in accordance with an embodiment of the present technology.

FIG. 5 shows an embodiment where the measurement system (e.g. the measurement system mentioned above in the discussion of the methods of FIGS. 1 to 4) is used as a calibration equipment for calibration of a production equipment. As shown in FIG. 5 the calibration equipment 500 is, for example, calibrated at a manufacturer side (or, generally, at the side of a trustworthy entity) and delivered to a user. The user is at the same time a user of an automated test equipment 501, e.g. previously also bought (or rented) from the manufacturer.

The reference information items defining the calibration equipment 500 and the allowed operating environmental conditions (e.g. as determined using the method according to FIG. 1 or according to FIG. 4) are stored at the local storage device 502, e.g. memory, of the calibration equipment 500 (e.g. by the manufacturer, or by another trustworthy entity). Additionally, the reference information items and the allowed operating environmental conditions are optionally stored in the remote server 503 of the manufacturer, e.g. in the cloud, to be used as a back-up in case the local storage device 502 is broken or does not function properly.

When the user uses the calibration equipment 500 to calibrate the automated test equipment 501, the validity state of the calibration equipment 500 is checked at the calibration equipment 500. This check may, for example, be performed using the method 200 according to FIG. 2 or using the method according to FIG. 3. Alternatively, however, the check may, for example, use a combination of the methods of FIGS. 2 and 3, wherein the method according to FIG. 2 may be supplemented by a check of the environmental operating conditions in accordance with the method of FIG. 3. If it is confirmed (e.g. in the check steps 203 and 204 of the method of FIG. 2, and in the check steps 304 and 305 of the method of FIG. 3) that the calibration equipment 500 is used in the valid state a certificate confirmation (or an electronic message, or a message on a user interface) that the calibration equipment 500 is used in the valid state could be issued by the calibration equipment 500 itself or by the manufacturer based on the result of the determination whether the calibration equipment 500 is used in the valid state, the result is provided to the manufacturer by the calibration equipment 500.

For example, the method could comprise checking: a) whether the automated test equipment has been calibrated using the measurement system within predetermined required intervals (e.g. once per specified period of time, or once per specified number of tests, or according to any other requirement rule); and b) whether the measurement system was "in good order" (i.e. not modified when compared to a reference state and/or operated at allowable environmental operating conditions) when calibrating the automated test equipment.

From such a check, it can be concluded that the automated test equipment was reliable when testing one or more devices under test. Thus, the certificate confirmation (which may, for example be provided in electronic form or in a printed form, or in any other appropriate form) may, for example, indicate the reliability of the automated test equipment at a certain time or when testing a certain batch of devices under test.

However, it should be noted that the system of FIG. 5 may optionally be supplemented by any of the features, functionalities and details disclosed herein, both individually or taken in combination.

Figures 6, 7:
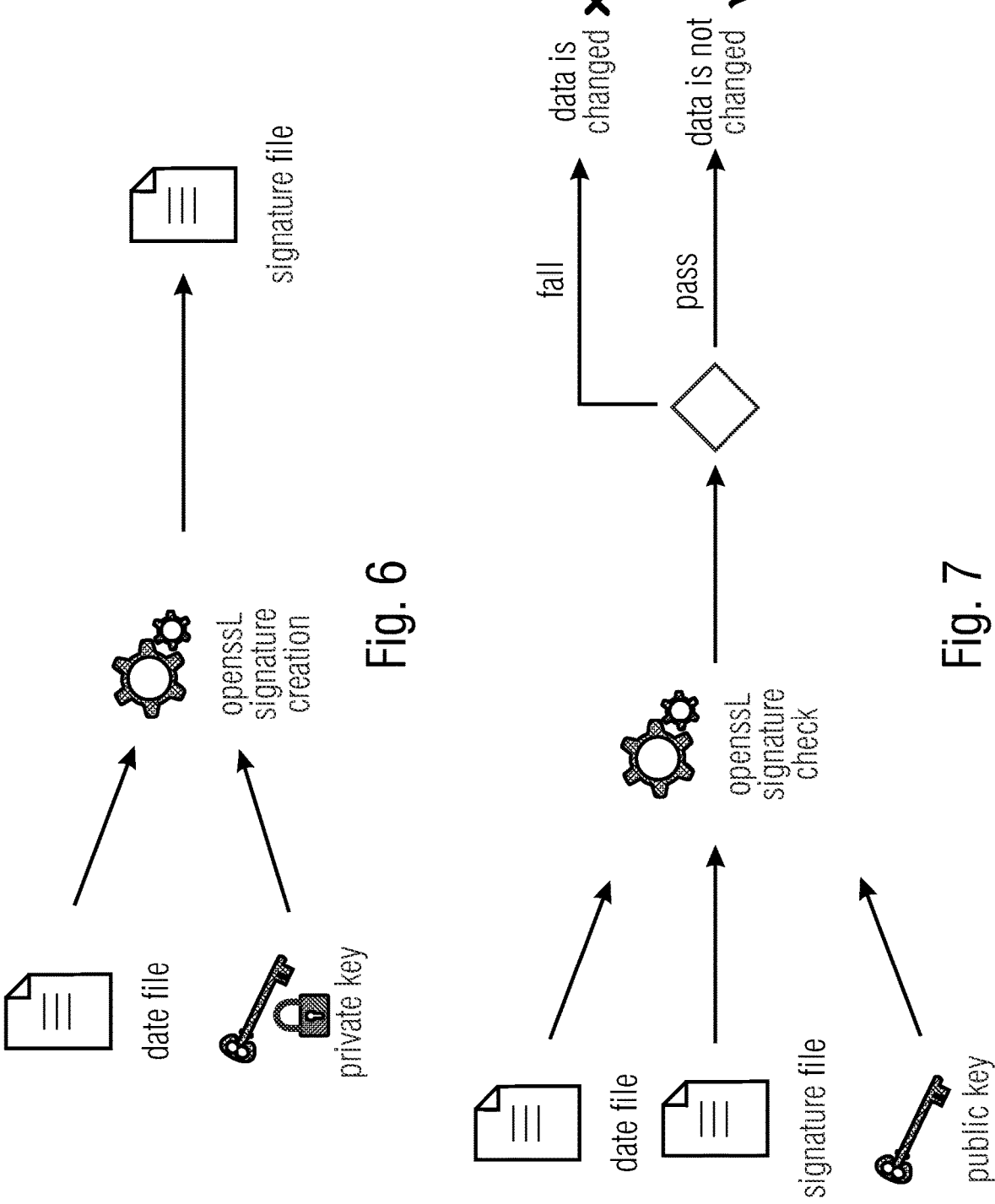
FIG. 6 shows a schematic representation of a procedure of creating a signature in accordance with an embodiment of the present technology.
FIG. 7 shows a schematic representation of a procedure of verifying an authenticity of the data file in accordance with an embodiment of the present technology.

FIG. 6 shows a procedure of creating a signature used as a step, e.g. in the method shown in FIG. 1 (and/or, optionally, in the method of FIG. 4). The data file, e.g. the summary file including the summary data, and a private key, e.g. a confidential private key, are used, for example, by an openSSL toolkit (or any other signature method) to create a signature based on the summary data. The data file is then signed by the created signature to protect its content (e.g., in the sense that it is possible to check authenticity and/or integrity of the data file using the signature). The signature is stored in the signature file. The signature and the signed data could be also stored in one file (not shown).

This signature (or signation) procedure is used to prohibit data, e.g. in the data file, e.g. the summary data, and/or the information describing the allowed environmental operating conditions, from being changed without the change being discovered. After the signature (or signature file) and the signed data file are stored, the signature (or the signature file), e.g. the signature stored in the signature file, could be used to verify an authenticity and/or integrity of the data file stored, e.g. to check whether the data file and/or the signature file was changed, as will be shown in FIG. 7.

To conclude, the signature process according to FIG. 6 may optionally be used in any of the methods and apparatuses disclosed herein, e.g. in order to allow for checking the authenticity and/or integrity of the summary file and/or of the information on the allowable environmental operating conditions.

However, it should be noted that the method of FIG. 6 may optionally be supplemented by any of the features, functionalities and details disclosed herein, both individually or taken in combination.

FIG. 7 shows a procedure of verifying an authenticity of the data file, e.g. containing reference summary data and/or information on the allowable environmental operating conditions, which is used, for example, in the method shown in FIG. 2 to check an integrity of a measurement system. The procedure of FIG. 7 many optionally be used in the method of FIG. 3 to check the authenticity and integrity of the information about the allowable environmental operating conditions.

As shown in FIG. 7, the match of the data file and the signature file is verified to check whether signed data and/or the signature of that data was changed since signation (or since signature). To check this match an openSSL toolkit (or any other signature check method) is used to perform a signature check using the stored data filed, the signature file and the public key (associated with the person or entity generating the signature using its private key). The public key corresponds to the private key which was used at signation (or signature), as shown in FIG. 6.

If the signature check is successful, e.g. pass result of the signature check is provided (or received), and the report that data is not changed (and/or authentic, i.e. generated by a trustworthy entity) is provided to the measurement system or other entity requesting the signature check to be performed. If the signature check failed, e.g. fail result of the signature check is received, the report that data is changed is provided to the measurement system or other entity requesting the signature check. Based on the report on the signature check result the measurement system integrity information may be provided (or received), e.g. as in the method shown in FIG. 2.

However, it should be noted that the method of FIG. 7 may optionally be supplemented by any of the features, functionalities and details disclosed herein, both individually or taken in combination.

Figure 8:
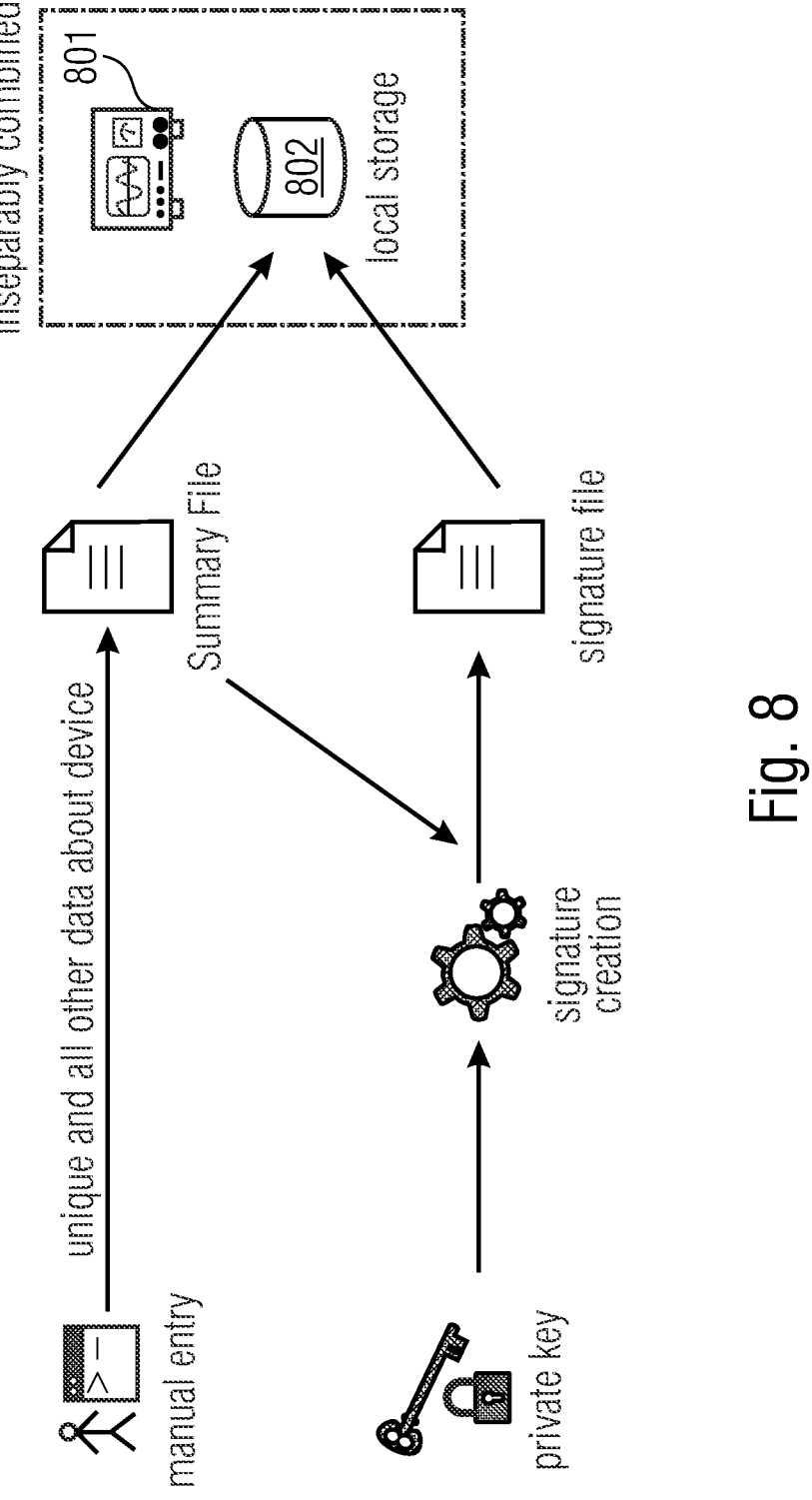
FIG. 8 shows a schematic representation of a procedure of enabling automatically reading out measurement system component specific information items identifying the measurement system components, which do not have a built-in functionality to report information items to identify the respective measurement system components in accordance with an embodiment of the present technology.

FIG. 8 shows a procedure of enabling automatically reading out measurement system component specific information items identifying the measurement system components, which do not have a built-in functionality to report information items to identify the respective measurement system components. The measurement system components, which do not have a built-in functionality to report information items to identify the respective measurement system components, are so called "manual" devices, e.g. old measurement equipment, passive components like cables, relays, power splitters, antennas, shielding devices or shielding boxes, etc. As shown in FIG. 8, the "manual" measurement system component 801 is combined with a local storage device 802, e.g. inseparably combined. Inseparably combining could be combining in such a way that the component 801 could not be separated from the local storage device 802 in a toolless manner, in a nondestructive manner, without breaking a seal, etc. The component 801 could be also glued, or welded, or riveted, or crimped, or molded to the local storage device 802. The component 801 could also be arranged in a separate housing, such as a box or under a separate cover together with the local storage device 802. The local storage device 802 could be any storage device, such as a USB storage device, a network attached storage device, an RFID tag, a wired-LAN storage device, a wireless-LAN storage device, etc. This list of storage devices is non-exclusive and any local storage device could be used.

As further shown in FIG. 8, one or more or even all information items uniquely identifying the "manual" component 801, such as a serial number or a type identifier, and/or information items representing one or more characteristics of the "manual" component, such as a software revision or a calibration date or a calibration interval, and any other data characterizing the "manual" device, such as a calibration interval, is (e.g. manually) written into a summary file. The content of the summary file is then signed, for example using a private key, to protect the data stored in the summary file from being changed (e.g. using the signature method described herein). The signation (or signature) procedure is, for example, the same as shown in FIG. 6. The created Signature file and the signed Summary file (or a combined file comprising summary and signature) are stored in the local storage device 802 combined with the "manual" device 801.

Therefore, the measurement system component specific information items identifying the "manual" measurement system components can be read out automatically upon performing any of the methods shown in FIGS. 1-4 and further methods described herein.

To conclude, the method of FIG. 8 may be used to obtain information about "passive" components, which may be used in the other methods disclosed herein (e.g. for checking whether any passive components have been exchanged). In other words, by providing the one or more passive components with corresponding storage devices (e.g. in an inseparable manner), the passive components can be monitored in the same manner as any active components (which are originally equipped to allow for a readout of unique identification information).

However, it should be noted that the method of FIG. 8 may optionally be supplemented by any of the features, functionalities and details disclosed herein, both individually or taken in combination.

Figure 9:
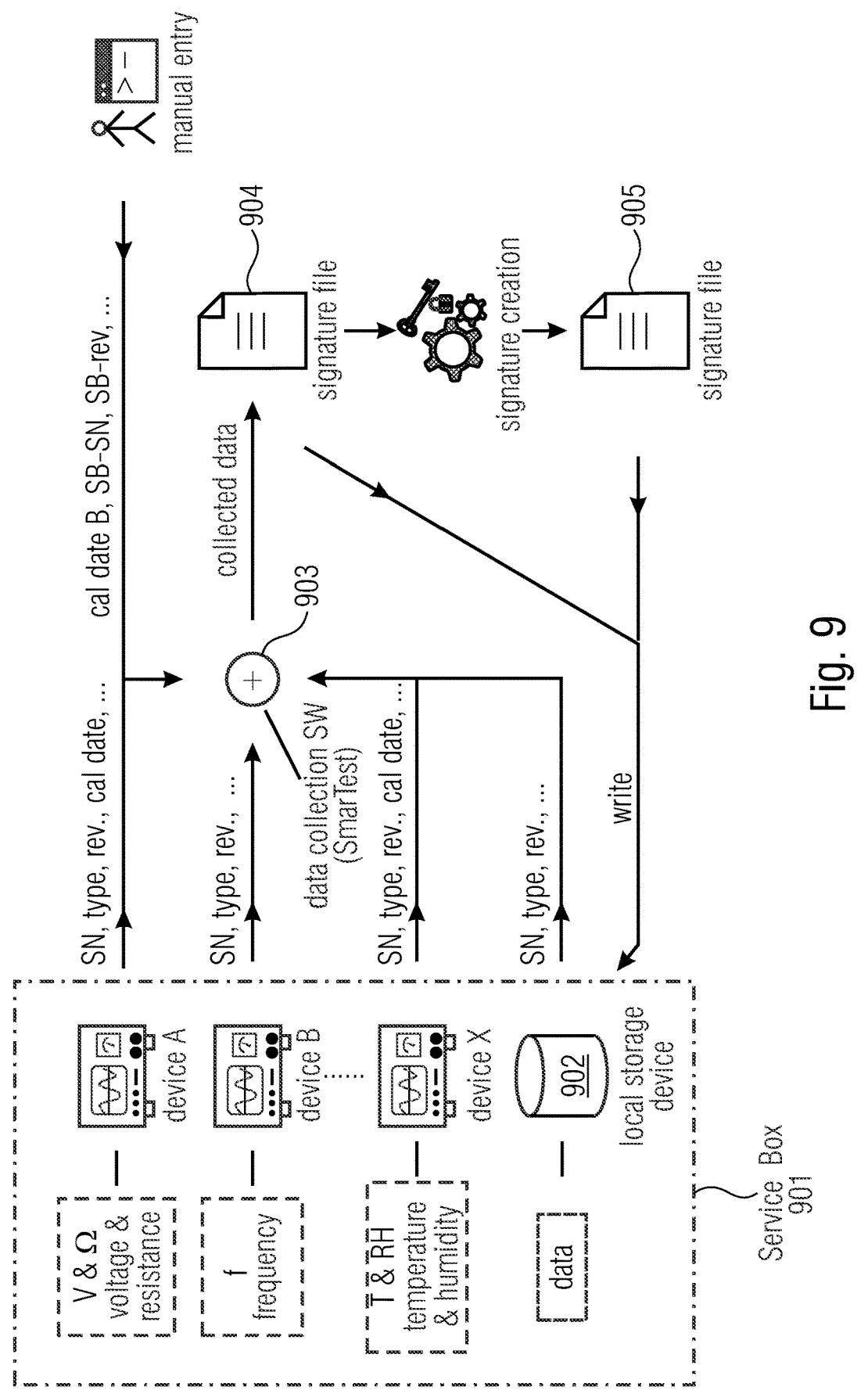
FIG. 9 shows a method of protecting the measurement system from unauthorized changes in accordance with an embodiment of the invention of the present technology.

FIG. 9 shows a schematic view of a measurement system comprising a plurality of measurement system components and a method of protecting the measurement system from unauthorized changes in accordance with an embodiment of the invention.

The measurement system 901 comprises a plurality of components A to X configured to measure different parameters of the production equipment (e.g. when performing a calibration of an automated test equipment), such as voltage, resistance and frequency. Some of the components are also configured to measure environmental conditions such as temperature or humidity, e.g. device X shown in FIG. 9. For example, there may be one or more components for measuring a temperature of the automated test equipment or in an environment of the automated test equipment, and there may, for example, also be one or more components for measuring a temperature (or any other environmental parameter) of the measurement system itself (or of one or more components of the measurement system itself). The measurement system 901 further comprises a local storage device 902 storing data on the measurement system components. The measurement system components conjuncted together form a Service Box provided by the manufacturer to the user to be used for measurement purposes, such as e.g., calibration (e.g. of an automated test equipment).

The measurement system components are conjuncted together by automatically storing their unique data into a Summary File. All the unique data, such as serial numbers, device types, software revisions, calibration dates, calibration intervals of each of the measurement system components are collected into a data collection 903. Some data on the components, e.g. calibration interval, or data on the conjuncted entity (Service Box), e.g. Service Box serial number, calibration date of the Service Box, or Service Box software revision are, for example, added manually to the data collection.

The data collection is then stored as a summary file 904 in the local storage device 902 of the measurement system 901. To prohibit the data stored in the summary file 904 from being changed, its content is signed by a signature creation procedure, e.g. the one shown in FIG. 6. The signature file 905 is also stored in the local storage device 902 of the measurement system 901. Alternatively, data summary and signature are stored in a single file.

The measurement system 901 is thus protected from unauthorized change and its integrity could be checked by the user during operation.

However, it should be noted that the method of FIG. 9 may optionally be supplemented by any of the features, functionalities and details disclosed herein, both individually or taken in combination.

Figure 10:
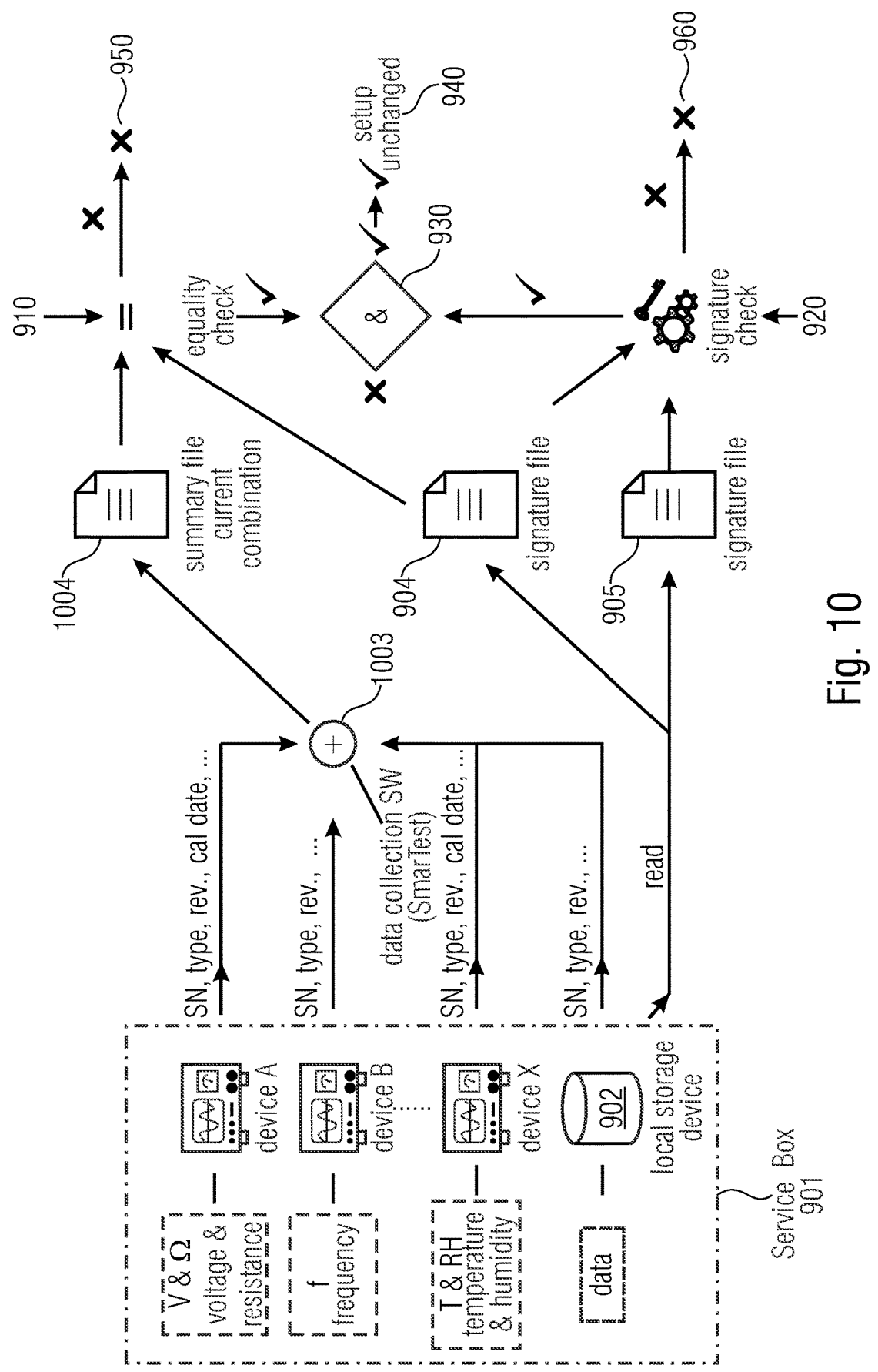
FIG. 10 shows a method of checking an integrity of the measurement system in accordance with an embodiment of the present technology.

FIG. 10 shows a procedure for checking an integrity of the measurement system 901, e.g. called a Service Box, shown in FIG. 9. The data on a plurality of parameters of the measurement system components, such as a serial numbers, types of components, software revisions, calibration dates, calibration interval are read out (e.g. from memories associated individually with the individual measurement system components) and collected into a data collection 1003. The data is read out automatically for the components with in-built functionality to report information items to identify the components. For those components which do not have an (originally) in-built functionality to report information items to identify the components (like, e.g., passive components), the procedure shown in FIG. 8 may, for example, be applied to enable automatically reading out measurement system component specific information items.

The data collection 1003 is represented by a summary file 1004 obtained as a result of automatically combining the readout data and representing a current combination of the measurement system 901.

The summary file 904 and the signature file 905 stored in the local storage device 902 of the measurement system 901 are read out from the local storage device. The summary file 1004 showing the current combination of the measurement system 901 is compared with the summary file 904, being a reference summary file, to perform an equality check 910. If the equality check is not successful, i.e., the current summary file 1004 is not equal to the reference summary file 904, the report 950 is issued that the measurement system state, or the measurement setup, was changed and the measurement system is not in a valid state for operating by the user.

Further to the equality check 910 a signature check 920 is performed to check whether the summary file 904 match the signature file 905. This check shows whether the stored summary file and signature file were changed after their storing in the local storage device 902 by the manufacturer of the measurement system 910. If the signature check 920 is not successful, i.e., the summary file 904 does not match to the signature file 905, the report 960 is issued that the measurement system state, or the measurement setup, was changed and the measurement system is not in a valid state for operating by the user.

If the results of both the equality check 910 and the signature check 920 are positive, the report 940 is issued that the measurement system state, or the measurement setup, is unchanged and the measurement system is in a valid state for operating by the user.

However, it should be noted that the method of FIG. 10 may optionally be supplemented by any of the features, functionalities and details disclosed herein, both individually or taken in combination.

In the following, further aspects and embodiments according to the invention will be described, which can be used individually or in combination with any other embodiments disclosed herein. Moreover, the embodiments disclosed in this section may optionally be supplemented by any other features, functionalities and details disclosed herein, both individually and taken in combination.

In the following, some purposes of the invention will be described which may be reached in some or all of the embodiments.

Embodiments according to the invention can ensure integrity of measurement equipment: for example, it can be ensured that the measurement equipment (e.g. the measurement system disclosed herein) correctly measures what it is supposed to measure.

Embodiments according to the invention are configured to check (or ensure) one or more of the following conditions (e.g. when operating the measurement system): correct environmental conditions (e.g. temperature, humidity); electromagnetic protection (e.g. presence of an electromagnetic protection, and/or state of the electromagnetic protection); track and check warm up time; track and check wear out conditions (e.g. relays); and traceability of equipment.

According to an aspect of the invention, utilized measurement equipment (e.g. components of the measurement system) is identifiable (e.g. serial number, unique identifier).

According to an aspect of the invention, there is a functionality to check calibration date of utilized measurement equipment (e.g. automatically), e.g. in order to ensure that a calibration state of the measurement equipment has not been changed, e.g. since a recordation of the state by an authorized entity. For example, it may be checked that there is no re-calibration by a non-authorized or non-trustworthy entity.

According to an aspect, target users of the concept disclosed herein may be engineers, technicians which need to operate reliable measurement equipment.

According to an aspect, embodiments according to the present invention allow for a business model which is based on (or provides the advantage of): Higher efficiency, less time needed, more cost-effective solution; no need to check integrity manually; and reduced risk of quality issues which may have significant cost impact in quality sensitive industries.

Conventionally, there are manual checks of boundary conditions which are required for reliable measurements which are error prone: manual check of coherence measurement systems; manual check of calibration status of utilized measurement equipment, manual pairing of calibration data and measurement equipment; and manual check of environmental conditions.

Conventionally, problems are caused by unknown effects of electromagnetic influence. Moreover, conventionally, problems are caused by incomplete traceability documentation of utilized measurement equipment. Conventionally, there is typically no check of wear out conditions.

Embodiments according to aspects of the invention are configured to overcome one or more of these disadvantages. For example, embodiments according to the invention are (optionally) adapted to perform an automatic check of coherence measurement systems. As another example, embodiments according to the invention are (optionally) adapted to perform an automatic check of calibration status of utilized measurement equipment, manual pairing of calibration data and measurement equipment. As another example, embodiments according to the present invention are adapted to automatically check environmental conditions. As another example, embodiments according to the invention are adapted to recognize problems which are caused by unknown effects of electromagnetic influence. As another example, embodiments according to the invention are adapted to allow for a good or even complete traceability documentation of utilized measurement equipment. As another example, embodiments according to the invention are adapted to automatically perform a check of wear out conditions.

In the following, aspects, ideas, features, functionalities and details will be described, which may optionally be introduced into any of the embodiments disclosed herein, both individually and in combination. However, the aspects described in the following may also be configured to form a self-consistent embodiment.

Some embodiments according to the invention create an aggregation of measurement equipment including data storage integrated into a higher level unit where appropriate operating conditions of the measurement system is ensured automatically.

Embodiments according to the present invention are (or comprise) an automatic check to ensure integrity of the measurement system. According to aspects of the invention, one or more of the following features, functionalities or checks may be implemented in embodiments according to the invention: automatic tracking of appropriate environmental conditions (e.g. humidity, temperature, electromagnetic radiation) using sensors or other measurement systems (optional); environmental conditions fit to instrument (e.g. measurement system component) (optional); instrument (e.g. measurement system component) and calibration data fit together (optional); instrument (e.g. measurement system component) is in good condition (e.g. calibrated) (optional); check of wear out conditions of components of the measurement system (e.g. relays) (optional); and measurement equipment (e.g. measurement system component) which can't be tracked automatically (e.g. which does not have a built in functionality to report information items; e.g. passive measurement system components) by itself is inseparably connected to the superior unit (e.g. an active measurement system component, which may, for example, be capable to report information items uniquely identifying it) and is automatically tracked by it (optional).

Embodiments according to the invention may optionally comprise an automatic generation of a certificate for executed measurements (e.g. performed by the measurement system; e.g. for a calibration of an automated test equipment). According to aspects of the invention, one or more of the following advantages, features, functionalities or checks may be implemented: traceability of utilized measurements instruments; serial number or unique identifier of utilized measurement systems is known; and validation of data before generation of certificate.

Optionally, embodiments according to the present invention provide for protection against external corruption. According to aspects of the invention, one or more of the following features, functionalities or checks may be implemented in embodiments according to the invention: data are encrypted; check whether systems have been swapped; and mechanical sealing of measurement systems and data storage to prevent unauthorized access.

According to an aspect, embodiments according to the present invention are adapted to ensure an integrity of a measurement setup (e.g. of a measurement system). In the following, it will be described how integrity of a measurement setup can be ensured.

In the following, it will be described how data can be prohibited from being changed. To prohibit data e.g. in a Data File from being changed without the change being discovered, its content can be signed. The resulting signature may be stored in a Signature File. Now the Signature File and/or the Data File cannot be changed without being discovered. As an example for signation (or signature), it should be noted that openSSL provides an option to sign any data with a signature. Therefore a (confidential) private key is used. An example of the procedure is shown in FIG. 6. This concept for prohibiting data from being changed may, optionally, be used in any of the embodiments disclosed herein, for example for protecting the summary file (which may take the place of the data file), and/or for protection of information about allowable environmental operating conditions (which information may in this case take the place of the data file), or, for example, for protection of a joint information (e.g. comprising the information of the summary file and the information about allowable environmental operating conditions).

In the following, it will be described how it can be checked whether data has been changed (and/or whether data are authentic, e.g., in that they originate form a trustworthy entity). To check whether signed data and/or the signature of that data was changed since signation (or signature), the match of the corresponding Data File and Signature File may need to be verified.

In the following, an example for signation (or signature) check will be described: openSSL provides an option to check, if signated (or signed) data matches to the corresponding signature. Therefore, a public key is required. This key corresponds to the private key used at signation (or signature). An example of the procedure is shown in FIG. 7.

This concept for checking whether data has been changed (and/or is authentic) may, optionally, be used in any of the embodiments disclosed herein, for example for checking whether the summary file (which may take the place of the data file) has been changed, and/or for checking whether information about allowable environmental operating conditions (which information may in this case take the place of the data file) has been changed, or, for example, for checking whether a joint information (e.g. comprising the information of the summary file and the information about allowable environmental operating conditions) has been changed.

In the following, it will be described how a "manual" device (e.g. a device or measurement system component which is—originally—not able to allow for an electronic readout of an information uniquely identifying the device or measurement system component) can be made to identify itself uniquely.

A "manual" device (e.g., old measurement equipment, cable, relay, etc.) may, for example, be inseparably combined with a local storage device with a communication interface. Some or even all uniquely (e.g., SN or serial number, and/or calibration date) and also other (e.g. calibration interval) data about this device is, for example, manually written into a Summary File. Optionally, to prohibit this data from being changed, its content is signed. Now the Signature File or/can the Summary File cannot be changed without being discovered. An example of a procedure is shown in FIG. 8.

In the following, a procedure wherein all device can identify themselves uniquely according to an aspect of the invention will be described. It may, for example, be assumed that all devices (e.g. all measurement system components) can identify themselves uniquely (e.g. using a built-in functionality to allow for a readout of information uniquely identifying the device, or using a concept as described in the section "How to make a "manual" device identifying itself uniquely", e.g. taking reference to FIG. 8).

According to an aspect of the invention, the devices (e.g. measurement system components) can be conjuncted together (e.g. logically) by automatically storing their unique data into a Summary File (e.g. a data file). Other data about the device (or about the devices) (e.g. calibration interval) or about the conjuncted entity—here ServiceBox (or a measurement system)—(e.g. SN or a serial number) may, for example, be added manually (or automatically) to the Summary File. Optionally, to prohibit this data from being changed, its content can be signed. Now the Signature File and the Summary File can't be changed without being discovered. An example of the procedure is shown in FIG. 9. Moreover, it should be noted that the procedure may be used as described in this section, and may optionally be supplemented by any of the features, functionalities and details disclosed herein (in this entire document), both individually and taken in combination.

In the following, a procedure to check measurement setup integrity according to an aspect of the invention will be described. To check that the measurement setup (e.g. a measurement system) was not changed, a Summary File about the current combination of devices (e.g. an information describing an actual combination of measurement system components at the time of the check) may be collected. This needs to be equal to the automatically generated part of the Summary File (or reference summary file) (e.g. those information items of the Summary file or reference summary file which have not been added by hand, but could be read out automatically from memories of the measurement system components or memories attached to the measurement system components) (which may, for example, have been generated at an earlier time, e.g. when the measurement system was assembled or checked or calibrated by a trustworthy person). Additionally, there needs to be a match of the Summary File and the Signature File. Otherwise, the measurement setup was changed since last signation.

For example, if it is found that there is a discrepancy (e.g. between the Summary File about the current combination of devices and the automatically generated part of the reference Summary File, or between the reference summary file and the signature file), a message may be provided indicating that the measurement system is in an invalid state. An example of the procedure is shown in FIG. 10. Moreover, it should be noted that the procedure may be used as described in this section, and may optionally be supplemented by any of the features, functionalities and details disclosed herein (in this entire document), both individually and taken in combination.

While none of the known methods consider the environmental conditions allowed for the proper operation of the measurement systems, embodiments according to the invention provide a significant improvement. While the outcome of the known methods highly depends on whether the measurement equipment is used at the same environment as provided upon its manufacturing and calibration, embodiments of the present invention allow for an automatic detection of an unreliable state of operation. Accordingly, an improper operation of the measurement equipment and errors in measurement results can be avoided.

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non— transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The herein described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method for determining whether a measurement system comprising a plurality of measurement system components is used in a valid state, the method comprising:

automatically reading out a plurality of readout information items identifying the plurality of measurement system components and representing one or more characteristics of the plurality of measurement system components;

automatically obtaining information on current operating environmental conditions for the measurement system;

automatically reading reference information items identifying the plurality of measurement system components and representing one or more characteristics of the plurality of measurement system components that are to remain unchanged and information on reference operating environmental conditions;

determining, based on a comparison of the readout information items with the reference information items, integrity of the measurement system, wherein a mismatch between the readout information items and the reference information items indicates that the measurement system is in an invalid state;

determining, based on a comparison of the current operating environmental conditions for the measurement system and the reference operating environmental conditions, whether the measurement system is operating in allowable operating environmental conditions, wherein operating outside the allowable operating environmental conditions indicates that the system is in the invalid state; and based on determining one or more of (1) that the integrity of the measurement system or (2) whether the measurement system is operating in allowable operating environmental conditions indicates that the measurement system is the invalid state, blocking use of the measurement system.

2. The method according to claim 1, further comprising:

reporting a result of the determination whether the measurement system comprising the plurality of measurement system components is used in the valid state.

3. The method according to claim 1, further comprising:

automatically blocking the measurement system if it is determined that the measurement system is used in the invalid state.

4. The method according to claim 1, wherein the measurement system comprises a calibration equipment, configured to calibrate production equipment.

5. The method according to claim 1, further comprising:

obtaining a certificate confirming that the measurement system is used in the valid state.

6. The method according to claim 5, wherein obtaining the certificate is performed by the measurement system or by a remote server.

7. The method according to claim 1, wherein one or more of the plurality of measurement system components which do not have a built-in functionality to report information items to identify the respective measurement system components are combined with associated local storage devices to enable automatically reading out measurement system component specific information items identifying the measurement system components which do not have a built-in functionality to report one or more information items to identify respective measurement system components.

8. The method according to claim 7, wherein the one or more of the plurality of measurement system components which do not have a built-in functionality to report information items to identify the respective measurement system components are inseparably combined with the associated local storage devices.

9. The method according to claim 8, wherein the one or more of the plurality of measurement system components which do not have a built-in functionality to report information items to identify the respective measurement system components are combined with respective associated local storage devices in a manner wherein the measurement system components cannot be separated from the respective associated local storage devices in one of a toolless manner; a nondestructive manner, or without breaking a seal.

10. The method according to claim 8, wherein at least one of the one or more of the plurality of measurement system components which do not have a built-in functionality to report information items to identify the respective measurement system components is glued to a respective one of the local storage devices.

11. The method according to claim 8, wherein at least one of the one or more of the plurality of measurement system components which do not have a built-in functionality to report information items to identify the respective measurement system components is disposed in a separate housing with a respective one of the local storage devices.

12. The method according to claim 1, wherein the one or more characteristics of the plurality of measurement system components comprise a wear out condition of at least one of the measurement system components.

13. A method for determining a state of a measurement system comprising:

reading out, from the measurement system, information items uniquely identifying a plurality of measurement system components;

comparing the readout information items to reference information items from the measurement system to determine whether the measurement system is used in a valid state, wherein the reference information items identify the plurality of measurement system components and represent one or more characteristics of the plurality of measurement components that are to remain unchanged and information on reference operating conditions;

determining, based on a comparison of the readout information items with the reference information items, integrity of the measurement system, wherein a mismatch between the readout information items and the reference information items indicates that the measurement system is in an invalid state;

determining, based on a comparison of current operating environmental conditions for the measurement system and the reference operating environmental conditions, whether the measurement system is operating in allowable operating environmental conditions, wherein operating outside the allowable operating environmental conditions indicates that the system is in the invalid state; and based on identifying a mismatch between the readout information items and the reference information items, determining that the measurement system is operating in the invalid state, the mismatch between the readout information items and the reference information items indicating one or more of (1) the integrity of the measurement system indicating that the measurement system is in the invalid state or (2) the current operating environmental conditions indicates that the measurement system is in the invalid state.

14. The method for determining the state of the measurement system of claim 13, further comprising:

reading out information items representing characteristics of the plurality of measurement system components; and comparing the readout information items representing characteristics of the plurality of measurement system components to reference characteristics to further determine whether the measurement system is used in the valid state.

15. The method for determining the valid state of the measurement system of claim 14, further comprising:

verifying an authenticity of the reference characteristics to further determine whether the measurement system is used in the valid state.

16. The method for determining the valid state of the measurement system of claim 15, further comprising:

combining the readout information items identifying the measurement system components and representing characteristics of the plurality of measurement system components as a summary file;

generating a signature based on the summary file; and storing the summary file and the signature in a memory.

17. The method for determining the valid state of the measurement system of claim 16, further comprising:

retrieving the summary file and the signature from the memory for comparing the readout information items to reference information items and the readout information items representing characteristics of the plurality of measurement system components to reference characteristics to determine whether the measurement system is used in a valid state, and to verify the authenticity of the information items identifying the measurement system components and representing characteristics of the plurality of measurement system components in the summary file retrieved from the memory.

18. The method for determining the valid state of the measurement system of claim 13, wherein one or more of measurement system components which do not have a built-in functionality to report the readout information items to identify the respective measurement system components are combined with associated local storage devices to enable reporting the readout information items to identify the respective one or more measurement system components.

\* \* \* \* \*